(12) United States Patent
Agudelo et al.

(10) Patent No.: US 9,487,998 B1
(45) Date of Patent: Nov. 8, 2016

(54) WINDOW BLINDS WITH SOLAR PANELS

(71) Applicants: Danny Agudelo, New Rochelle, NY (US); Maria Agudelo, New Rochelle, NY (US)

(72) Inventors: Danny Agudelo, New Rochelle, NY (US); Maria Agudelo, New Rochelle, NY (US)

(*) Notice: Subject to any disclaimer, the term of this patent is extended or adjusted under 35 U.S.C. 154(b) by 0 days.

(21) Appl. No.: 14/881,286

(22) Filed: Oct. 13, 2015

(51) Int. Cl.
| | |
|---|---|
| *E06B 9/00* | (2006.01) |
| *E06B 9/38* | (2006.01) |
| *E06B 9/28* | (2006.01) |
| *H04N 7/18* | (2006.01) |
| *H04N 5/225* | (2006.01) |
| *H04N 5/44* | (2011.01) |
| *E06B 9/24* | (2006.01) |

(52) U.S. Cl.
CPC . *E06B 9/38* (2013.01); *E06B 9/28* (2013.01); *H04N 5/2252* (2013.01); *H04N 5/44* (2013.01); *H04N 7/18* (2013.01); *E06B 2009/2476* (2013.01)

(58) Field of Classification Search
CPC ......... G08B 13/196; E06B 9/38; E06B 9/28; E06B 9/323; H04N 5/2252
USPC ....................................... 160/1–7
See application file for complete search history.

(56) References Cited

U.S. PATENT DOCUMENTS

| | | | | |
|---|---|---|---|---|
| 4,137,098 | A | | 1/1979 | Field |
| 4,160,972 | A | * | 7/1979 | La Mell ................. G08B 13/08 160/10 |
| 4,254,813 | A | * | 3/1981 | Vecchiarelli ............. A47H 2/00 160/19 |
| 4,384,605 | A | * | 5/1983 | Schaeffer ................. E06B 9/38 160/178.1 R |
| 4,516,482 | A | * | 5/1985 | Smith ....................... F24F 9/00 160/117 |
| 4,577,437 | A | * | 3/1986 | Gionet .................... E05F 15/73 318/480 |
| 4,862,141 | A | * | 8/1989 | Jordal .................. G08B 19/005 200/61.81 |
| 4,974,658 | A | * | 12/1990 | Komatsu ................... E06B 9/13 160/133 |
| 5,221,363 | A | | 6/1993 | Gillard |
| 5,413,161 | A | | 5/1995 | Corazzini |
| 5,440,289 | A | * | 8/1995 | Riordan ............... G08B 13/126 160/374 |
| 5,760,558 | A | | 6/1998 | Popat |
| 5,929,580 | A | * | 7/1999 | Mullet ................. H02H 7/0851 160/292 |
| 6,023,224 | A | * | 2/2000 | Meyvis ................... E05B 47/00 315/153 |
| 6,057,658 | A | * | 5/2000 | Kovach .................. E06B 9/262 318/16 |

(Continued)

FOREIGN PATENT DOCUMENTS

| | | | | |
|---|---|---|---|---|
| CH | WO 2010136917 A1 | * | 12/2010 | ............... E06B 9/70 |
| EP | 2525041 A2 | | 11/2012 | |
| JP | WO 2010119876 A1 | * | 10/2010 | ............. E06B 9/264 |

*Primary Examiner* — Katherine Mitchell
*Assistant Examiner* — Johnnie A Shablack

(57) ABSTRACT

The window blinds with solar panels comprises a set of window blinds with a cover positioned along a top portion of the window blinds. Moreover, the cover is positioned on an inner side of the set of window blinds. A motion sensor and camera are mounted on the cover of the window blinds. The camera relays a video stream to a Bluetooth activated device upon detection of motion via the motion sensor. The set of window blinds further includes at least one solar panel located on an outer surface, and which is adapted to receive sunlight through a window. The set of window blinds is further defined with a housing, which is adapted to be secured to a top surface of a window frame. The housing enables the cover to be attached thereto.

5 Claims, 5 Drawing Sheets

(56) References Cited

U.S. PATENT DOCUMENTS

| | | | | |
|---|---|---|---|---|
| 6,062,290 | A * | 5/2000 | Domel | E06B 9/36 160/176.1 V |
| 6,369,530 | B2 * | 4/2002 | Kovach | E06B 9/32 318/16 |
| 7,599,002 | B2 * | 10/2009 | Willes | F16M 13/02 348/151 |
| 7,612,667 | B2 | 11/2009 | Montague | |
| 7,617,857 | B2 | 11/2009 | Froese | |
| 7,900,680 | B2 * | 3/2011 | Garmyn | E06B 9/42 160/23.1 |
| 7,940,300 | B2 * | 5/2011 | Spinelli | H04N 7/183 348/143 |
| 8,432,117 | B2 * | 4/2013 | Berman | E06B 9/322 318/280 |
| 8,678,069 | B2 | 3/2014 | Choi | |
| 8,714,230 | B2 * | 5/2014 | Marszalek | E06B 9/0692 160/121.1 |
| 8,820,388 | B2 * | 9/2014 | Mullet | E06B 9/322 160/310 |
| 8,994,496 | B2 * | 3/2015 | Freese | G08C 17/00 160/310 |
| 9,267,327 | B2 * | 2/2016 | Feldstein | G05B 11/01 |
| 2005/0274463 | A1 * | 12/2005 | Becker | E06B 7/32 160/98 |
| 2006/0000558 | A1 * | 1/2006 | Fennell | E06B 9/42 160/7 |
| 2006/0137261 | A1 * | 6/2006 | Maly | B65G 69/2882 52/36.3 |
| 2007/0284053 | A1 * | 12/2007 | Mullet | E06B 9/42 160/31 |
| 2009/0059574 | A1 | 3/2009 | Lewis | |
| 2009/0308543 | A1 * | 12/2009 | Kates | E06B 9/44 160/5 |
| 2010/0319257 | A1 * | 12/2010 | Taheri | E06B 9/70 49/31 |
| 2011/0007130 | A1 * | 1/2011 | Park | H04N 7/181 348/38 |
| 2011/0048655 | A1 * | 3/2011 | Andreasen | E06B 9/72 160/310 |
| 2011/0254685 | A1 * | 10/2011 | Karasek | E05F 15/74 340/540 |
| 2012/0029704 | A1 * | 2/2012 | Ackermann | E06B 9/322 700/275 |
| 2013/0300866 | A1 | 11/2013 | Kildevaeld, III | |
| 2014/0262078 | A1 * | 9/2014 | Colson | E06B 9/68 160/310 |
| 2014/0318716 | A1 * | 10/2014 | Patel | H05B 37/0218 160/1 |
| 2014/0352897 | A1 * | 12/2014 | Mullet | E06B 9/42 160/323.1 |
| 2015/0059990 | A1 * | 3/2015 | Adrain | F41H 5/026 160/10 |
| 2015/0160528 | A1 * | 6/2015 | Rekimoto | E06B 9/24 348/239 |
| 2015/0177709 | A1 * | 6/2015 | Gill | G05B 11/01 160/7 |
| 2015/0204561 | A1 * | 7/2015 | Sadwick | F24F 11/006 236/1 C |
| 2015/0284997 | A1 * | 10/2015 | Hall | E06B 9/303 160/7 |
| 2015/0348401 | A1 * | 12/2015 | Hall | G01R 19/0092 340/12.54 |

* cited by examiner

WINDOW BLINDS WITH SOLAR PANELS

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of window blinds, more specifically, a window blind that, among other things, includes solar panels thereon.

SUMMARY OF INVENTION

The window blinds with solar panels comprises a set of window blinds with a cover positioned along a top portion of the window blinds. Moreover, the cover is positioned on an inner side of the set of window blinds. A motion sensor and camera are mounted on the cover of the window blinds. The camera relays a video stream to a Bluetooth activated device upon detection of motion via the motion sensor. The set of window blinds further includes at least one solar panel located on an outer surface, and which is adapted to receive sunlight through a window. The set of window blinds is further defined with a housing, which is adapted to be secured to a top surface of a window frame. The housing enables the cover to be attached thereto. The housing is of hollowed construction, and enables wiring to extend therein, and from the at least one solar panel, the camera, and the motion sensor. The housing also includes a powering member, and a data storage member.

These together with additional objects, features and advantages of the window blinds with solar panels will be readily apparent to those of ordinary skill in the art upon reading the following detailed description of the presently preferred, but nonetheless illustrative, embodiments when taken in conjunction with the accompanying drawings.

In this respect, before explaining the current embodiments of the window blinds with solar panels in detail, it is to be understood that the window blinds with solar panels is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the window blinds with solar panels.

It is therefore important that the claims be regarded as including such equivalent construction insofar as they do not depart from the spirit and scope of the window blinds with solar panels. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
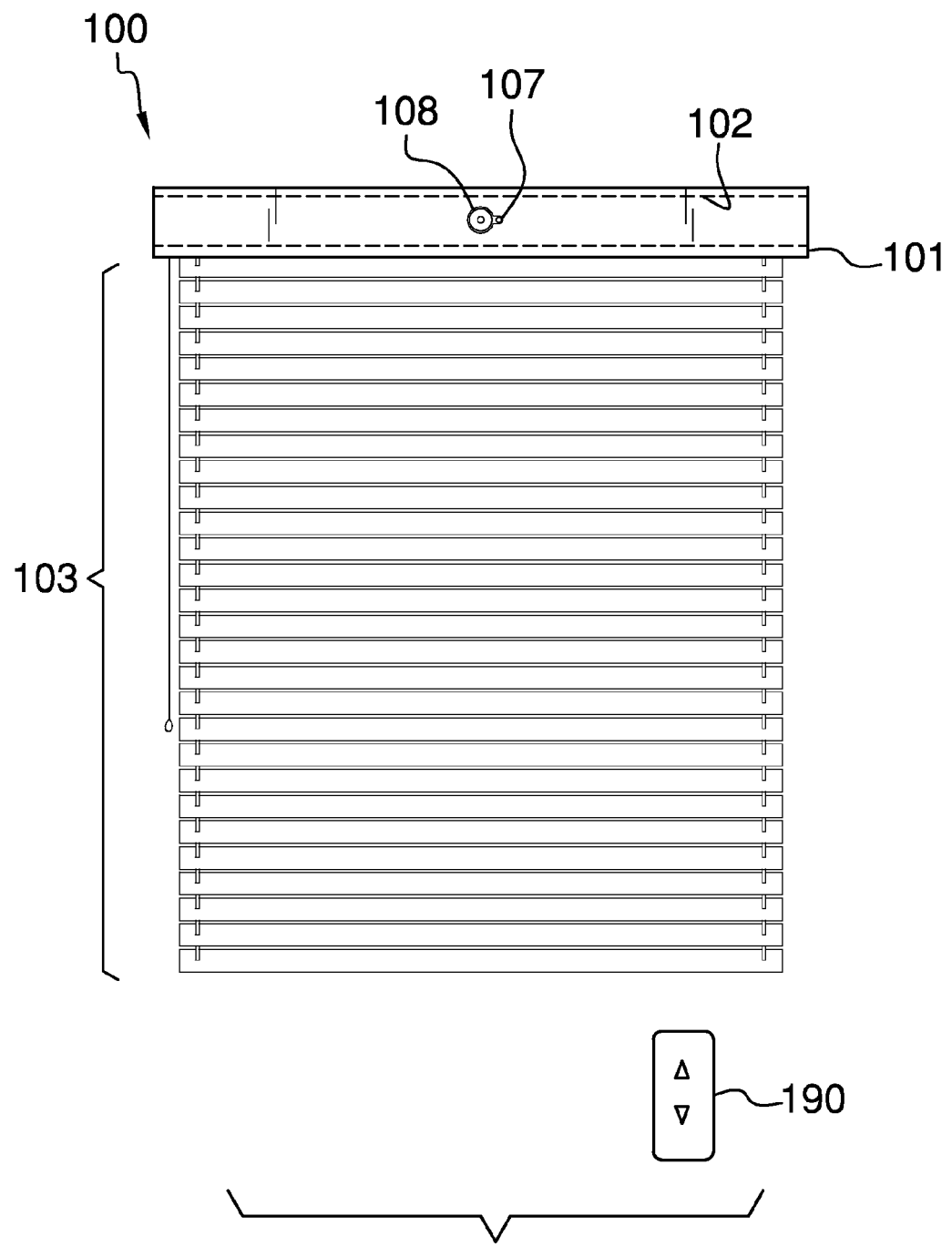
FIG. 1 is a front view of an embodiment of the disclosure.
Figure 2:
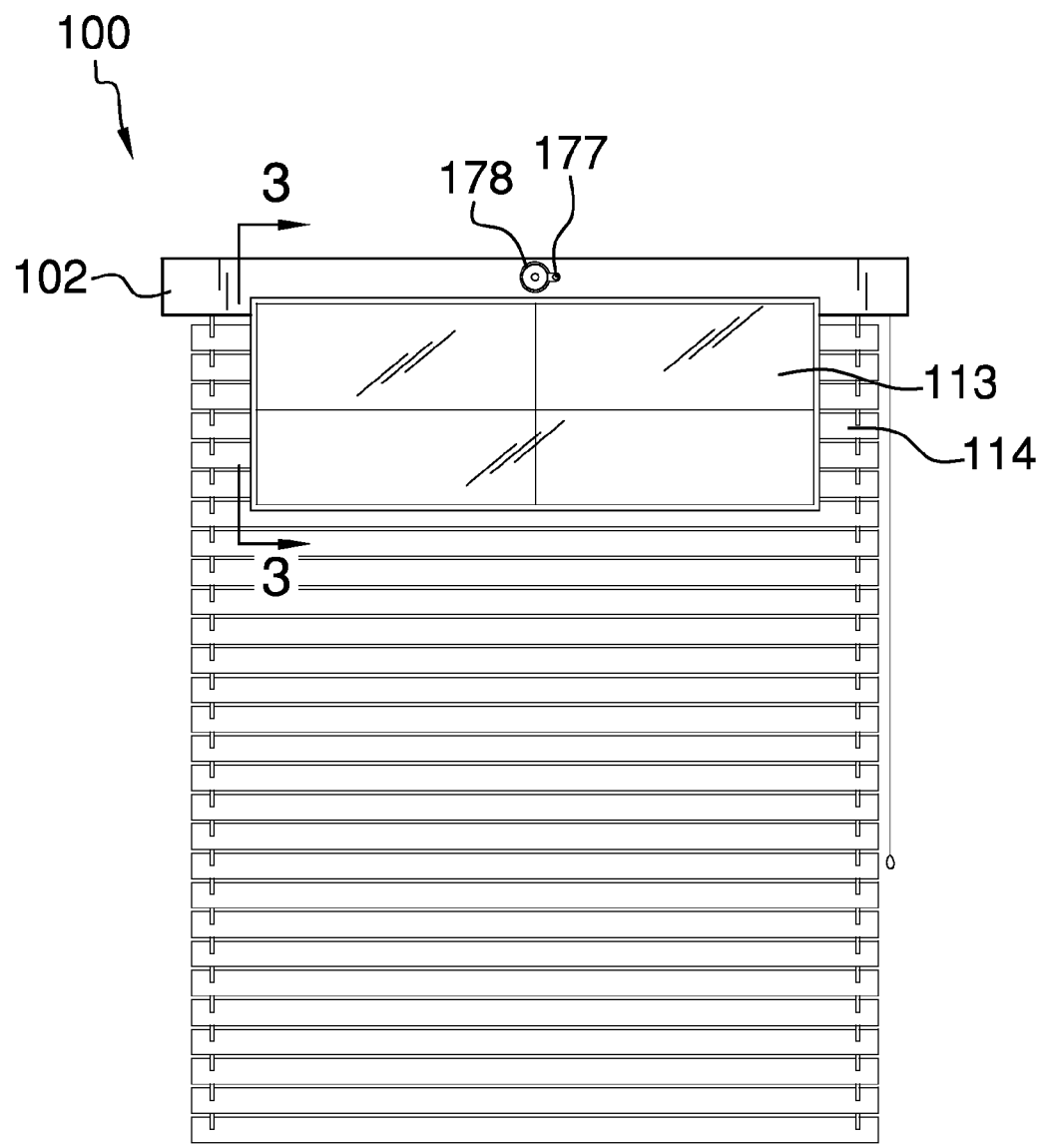
FIG. 2 is a rear view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 5. The window blinds with solar panels 100 (hereinafter invention) comprises a cover 101 that is attachable to a housing 102. The housing 102 supports a set of window blinds 103 therefrom. Moreover, the housing 102 is adapted to secure onto a top surface 201 of a window frame 202. The housing 102, the set of window blinds 103, and the cover 101 are collectively adapted to interface against an inner window surface 203 of a window 204.

The cover 101 is attached to a front surface 104 of the housing 102. The housing 102 is also further defined with a top housing surface 105 that adaptively rests against the top surface 201 of the window frame 202. The cover 101 includes cover brackets 106 that secure the cover 101 against the front surface 104 of the housing 102. Moreover, the cover 101 includes a first motion sensor 107 and a first camera 108. The first motion sensor 107 and the first camera 108 are adapted to view away from the invention 100, and more specifically, a room 300.

A powering member 109 is located inside of the housing 102. The housing 102 being of hollowed construction, includes the powering member 109 therein. The powering member 109 is further defined as at least one battery. The powering member 109 is also in wired connection with a central processing unit 110. The central processing unit 110 is in wired connection with the first motion sensor 107 and the first camera 108. The central processing unit 110 is in wired connection with a data storage member 111 as well as a Bluetooth transceiver 112.

The powering member 109 is in wired communication with at least one solar cell 113. The at least one solar cell 113 is positioned behind a rear surface 174 of the housing 102. The at least one solar cell 113 faces the inner window surface 203 of the window 204 in order to collect sunlight, which is transferred into electricity, which is then directed to the powering member 109. That being said, the powering member 109 interfaces between both the at least one solar cell 113 and the central processing unit 111.

The central processing unit 111 is wired to the first motion sensor 107 via a first motion sensor wire 114. The central processing unit 111 is wired to the first camera 108 via a first camera wire 115. The powering member 109 is wired to the central processing unit 111 via a powering member wire 116. The at least one solar cell 113 is wired to the powering member 109 via a solar wire 117. The central processing unit 111 is wired to the Bluetooth transceiver 112 via a Bluetooth wire 118. The central processing unit 111 is wired to the data storage member 111 via a data wire 120. The central processing unit 111 is adapted to be able to communicate wirelessly with a Bluetooth readied device 400 via the Bluetooth transceiver 112. Moreover, the Bluetooth transceiver 112 provides a video feed of the first camera 108 so that remote viewing of the room 300 is accomplished where the first motion sensor 107 detects movement in the room 300.

The configuration of the invention 100, enables the set of window blinds 103 to resemble a set of traditional window blinds. In other words, the invention 100 provides a security enhancement for the room 300 whilst looking like an ordinary set of window blinds. It shall be noted that when the set of window blinds 103 are closed, the at least one solar cell 113 is not visible, and further enhances the overall objective of being an indiscreet form of video surveillance. It shall be noted that the size and shape of the at least one solar cell 113 may further add to the indiscreet quality of video surveillance afforded the invention 100 where the set of window blinds are in an opened configuration.

Figure 3:
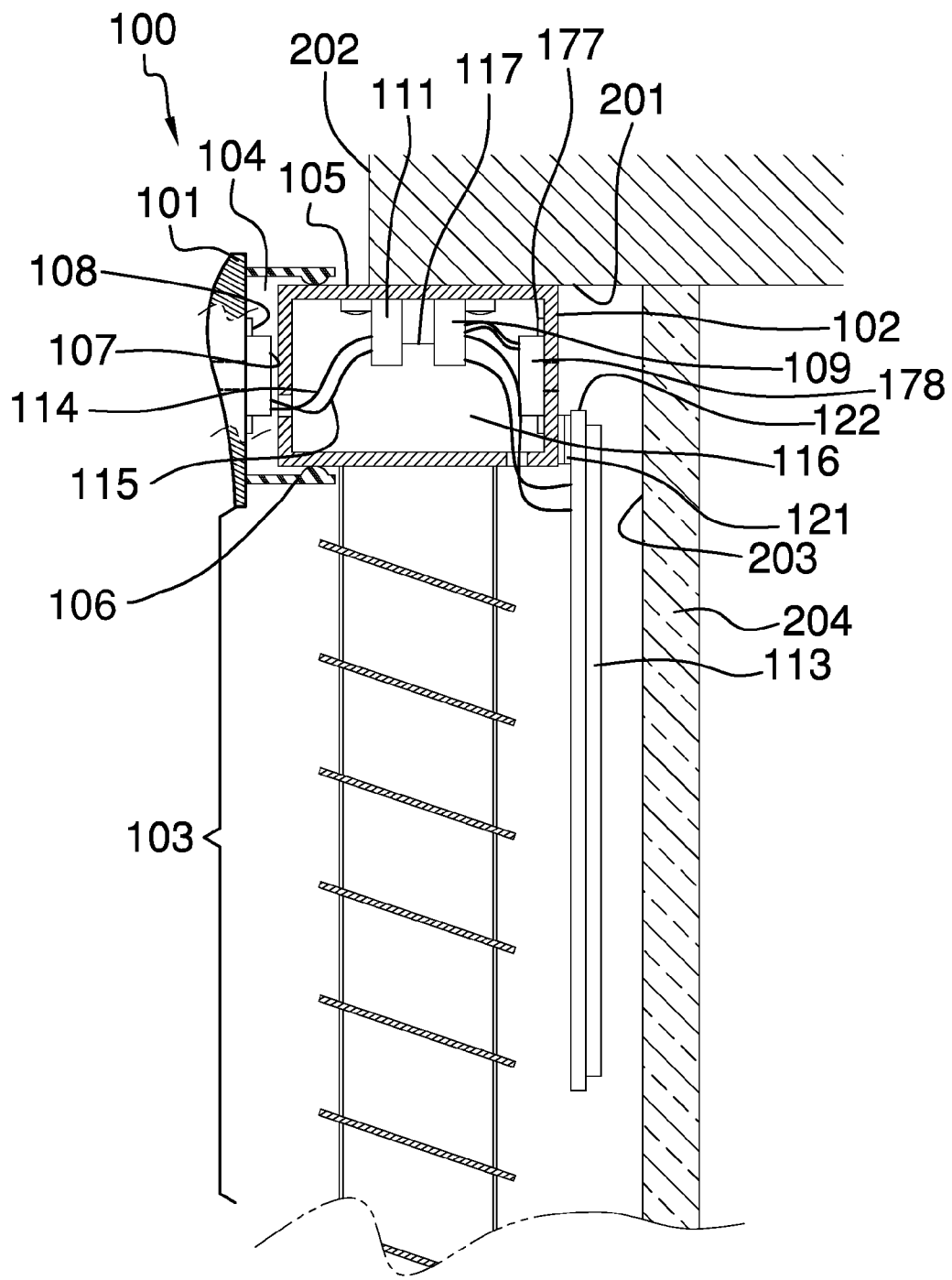
FIG. 3 is a cross-sectional view of an embodiment of the disclosure along line 3-3 in FIG. 2.
Figure 4:
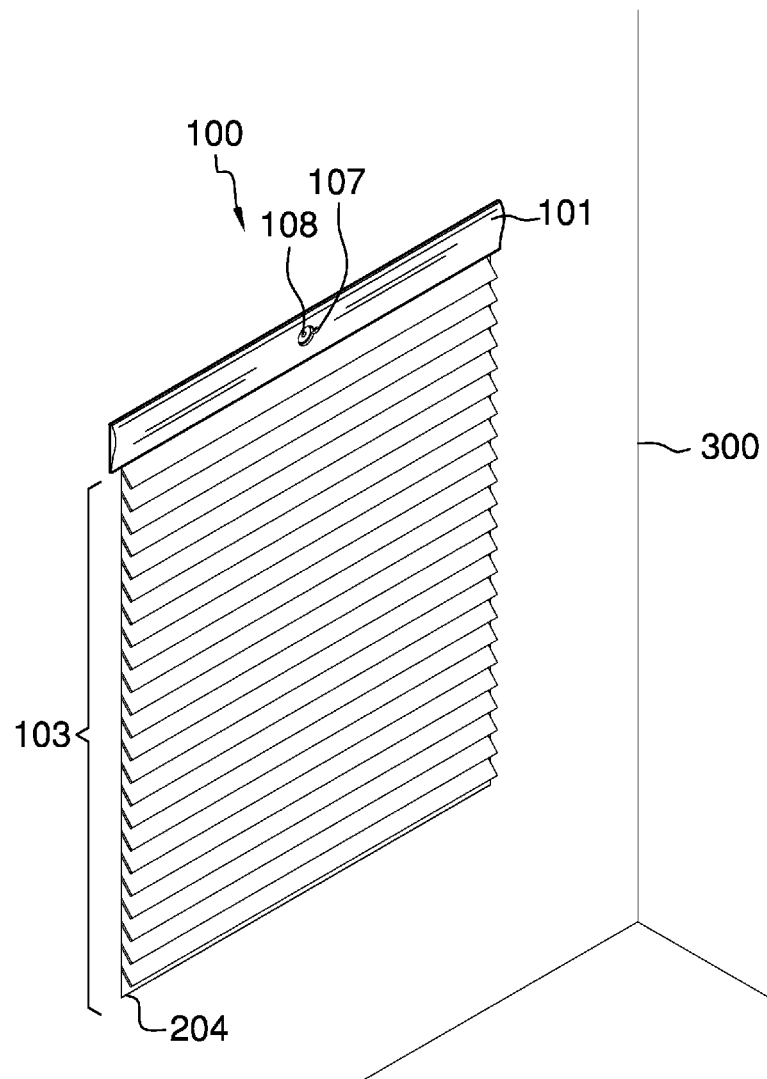
FIG. 4 is a perspective view of an embodiment of the disclosure in use.
Figure 5:
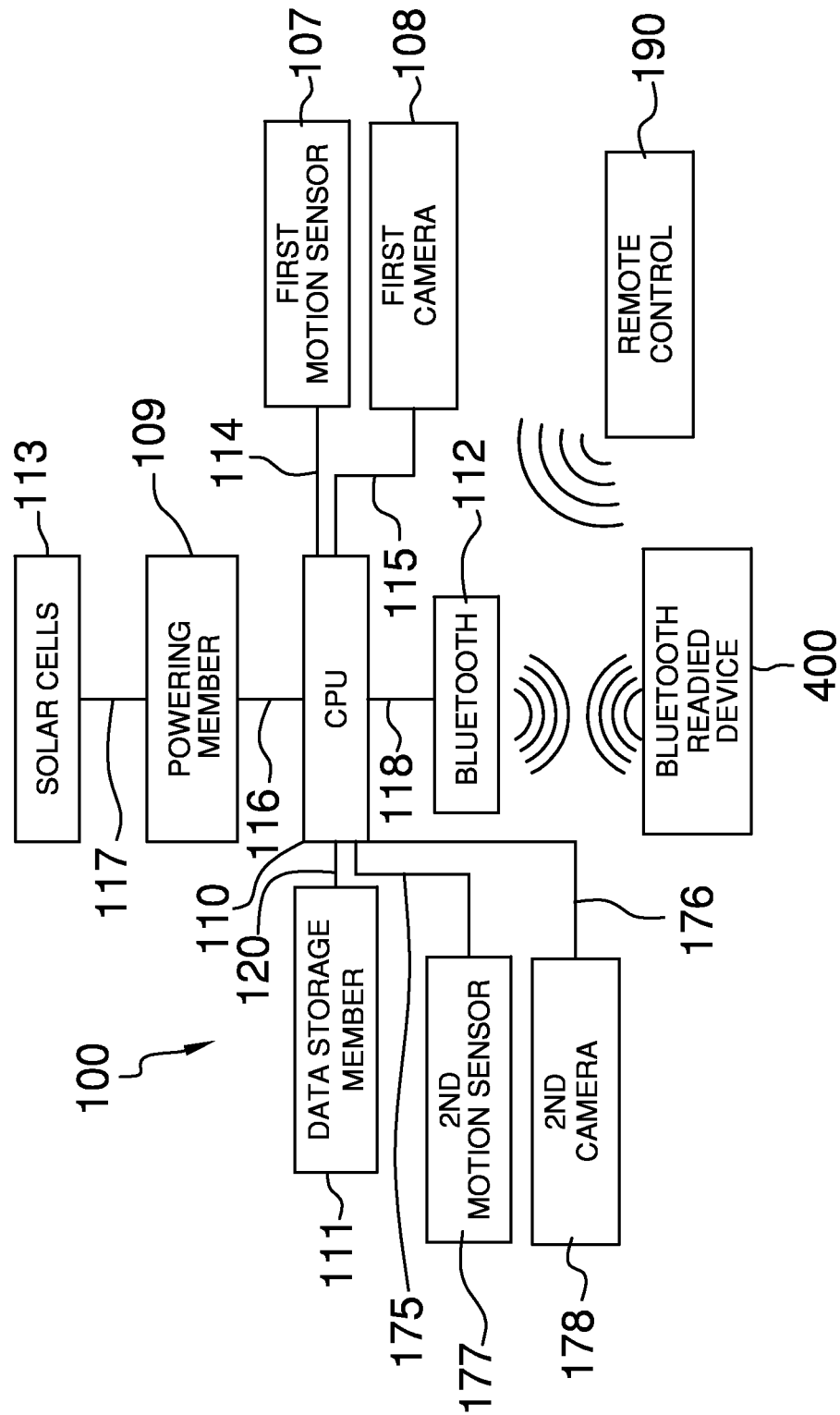
FIG. 5 is a block diagram of an embodiment of the disclosure.

Referring to FIG. 3, the at least one solar cell 113 is secured to the housing 102 via a securing member 121. The securing member 121 comprises the use of nylon hook and loop strips. Moreover, the securing member 121 is provided adjacent a top solar edge 122 of the at least one solar cell 113 such that the at least one solar cell 113 is able to hang down from the housing 102.

The first motion sensor 107 and the first camera 108 are directed to be in view of the room 300. The invention 100 includes a second motion sensor 177 and a second camera 178. Both the second motion sensor 177 and the second camera 178 are directed to be in an opposite view of the first motion sensor 107 and the first camera 108. Both the second motion sensor 177 and the second camera 178 are in view of the window 204 in order to detect motion and record video through the window 204. Both the second motion sensor 177 and the second camera 178 detect and record video outside of the room 300 via the window 204.

The second motion sensor 177 and the second camera 178 are in wired connection with the central processing unit 110. The central processing unit 110 is responsible for providing electrical needs of the second motion sensor 177 and the second camera 178, alike of the first motion sensor 107 and the first camera 108. The second motion sensor 177 is wired to the central processing unit 110 via a second motion sensor wire 175. The second camera 178 is wired to the central processing unit 110 via a second camera wire 176.

The data storage member 111 is able to store video footage taken from the first camera 108 and the second camera 178. Moreover, the data stored on the data storage member 111 may be retrieved remotely via the Bluetooth transceiver 112. Subsequent retrieval of data may afford greater efficiency of use of electricity such that the first camera 108 is not required to perform live streaming of a video feed via the Bluetooth transceiver 112.

The invention 100 may optionally include a remote control 190 that interfaces with the Bluetooth transceiver 112 in lieu of the Bluetooth readied device 400. The remote control 190 being able to control use of the invention 100 in all aspects, and or in conjunction with the Bluetooth readied device 400.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

Is shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A window blinds comprising:
a housing from which a set of window blinds hang;
wherein a cover is secured to the housing;
wherein the cover includes a motion sensor and a camera thereon, and which enables the camera to operate when motion is adaptively sensed via said motion sensor;
wherein the set of window blinds is adapted to be positioned adjacent a window in a room;
wherein the housing is adapted to secure onto a top surface of a window frame of said window;
wherein the housing, the set of window blinds, and the cover are collectively adapted to interface against an inner window surface of said window;
wherein the cover is attached to a front surface of the housing; wherein the housing is also further defined with a top housing surface that adaptively rests against the top surface of the window frame;
wherein the cover includes cover brackets that secure the cover against the front surface of the housing;
wherein the camera is further defined to include a first camera; wherein the motion sensor is further defined to include a first motion sensor;
wherein the first motion sensor and the first camera are adapted to view away from the housing;
wherein a powering member is located inside of the housing; wherein the housing being of hollowed construction, includes the powering member therein;
wherein the powering member is further defined as at least one battery;
wherein the powering member is in wired connection with a central processing unit;
wherein the central processing unit is in wired connection with the first motion sensor and the first camera;
wherein the central processing unit is in wired connection with a data storage member as well as a Bluetooth transceiver;
wherein the powering member is in wired communication with at least one solar cell;

wherein the at least one solar cell is positioned behind a rear surface of the housing;

wherein the at least one solar cell faces the inner window surface of the window in order to collect sunlight, which is transferred into electricity, which is then directed to the powering member;

wherein the powering member interfaces between both the at least one solar cell and the central processing unit;

wherein the central processing unit is wired to the first motion sensor via a first motion sensor wire;

wherein the central processing unit is wired to the first camera via a first camera wire;

wherein the powering member is wired to the central processing unit via a powering member wire;

wherein the at least one solar cell is wired to the powering member via a solar wire;

wherein the central processing unit is wired to the Bluetooth transceiver via a Bluetooth wire;

wherein the central processing unit is wired to the data storage member via a data wire;

wherein the central processing unit is adapted to be able to communicate wirelessly with a Bluetooth readied device via the Bluetooth transceiver;

wherein the Bluetooth transceiver provides a video feed of the first camera so that remote viewing of the room is accomplished where the first motion sensor detects movement in the room;

wherein at least one solar cell is secured to the housing via a securing member;

wherein the securing member is provided adjacent a top solar edge of the at least one solar cell such that the at least one solar cell is able to hang down from the housing.

2. The window blinds according to claim 1 wherein the first motion sensor and the first camera are directed to be in view of the room; wherein a second motion sensor and a second camera are included; wherein both the second motion sensor and the second camera are directed to be in an opposite view of the first motion sensor and the first camera.

3. The window blinds according to claim 2 wherein both the second motion sensor and the second camera are in view of the window in order to detect motion and record video through the window, respectively; wherein the second motion sensor is able to detect motion through the window, and the second camera is able to record video outside of the room via the window.

4. The window blinds according to claim 3 wherein the second motion sensor and the second camera are in wired connection with the central processing unit; wherein the central processing unit is responsible for providing electrical needs of the second motion sensor and the second camera, alike of the first motion sensor and the first camera; wherein the second motion sensor is wired to the central processing unit via a second motion sensor wire; wherein the second camera is wired to the central processing unit via a second camera wire.

5. The window blinds according to claim 4 wherein the data storage member is able to store video footage taken from the first camera and the second camera; wherein the data stored on the data storage member is retrieved remotely via the Bluetooth transceiver; wherein a remote control that interfaces with the Bluetooth transceiver in lieu of or in conjunction with the Bluetooth readied device.

* * * * *